United States Patent [19]

Lowry et al.

[11] Patent Number: 5,686,674
[45] Date of Patent: Nov. 11, 1997

[54] SYSTEM FOR CHARACTERIZING SURFACES OF PIPES, DUCTS OR SIMILAR STRUCTURES

[75] Inventors: William E. Lowry; Sandra Dalvit Dunn, both of Santa Fe; Charles D. Cremer; Eric J. Cramer, both of Albuquerque, all of N. Mex.

[73] Assignee: Science and Engineering Associates, Inc., Albuquerque, N. Mex.

[21] Appl. No.: 514,592

[22] Filed: Aug. 14, 1995

[51] Int. Cl.$^6$ .................................................. E21B 23/08
[52] U.S. Cl. .............................................. 73/865.8; 92/92
[58] Field of Search .......................... 73/865.8, 866.5, 73/623; 324/220; 92/90, 92

[56] References Cited

U.S. PATENT DOCUMENTS

| | | |
|---|---|---|
| 3,050,118 | 8/1962 | Elkins . |
| 3,500,819 | 3/1970 | Silverman . |
| 3,589,356 | 6/1971 | Silverman . |
| 4,522,125 | 6/1985 | Marz . |
| 4,778,553 | 10/1988 | Wood . |
| 5,176,207 | 1/1993 | Keller . |
| 5,501,115 | 3/1996 | Kamiyama et al. ............... 73/865.8 |

*Primary Examiner*—Robert Raevis
*Attorney, Agent, or Firm*—Kevin Lynn Wildenstein, Esq.; DeWitt M. Morgan, Esq.

[57] ABSTRACT

A system for characterizing contamination or integrity information from within a pipe, including a flexible tubular membrane which is extendable within the pipe and inflatable to a diameter effective to urge the tubular membrane against the rigid wall. The tubular membrane has a first end and a second end, and is initially rolled up and connected to a reel inside of a deployment system. A tether connects the deployment system to a characterization tool retained within the tubular membrane, which is attached adjacent to the second end of the tubular membrane. When the system is engaged, pressurized fluid enters the tubular membrane causing the membrane to invert and distend into and through the pipe's interior. Simultaneously, the attached characterization tool is towed adjacent to and in parallel with the path of the tubular membrane's second end, is protected from contamination by the surrounding tubular membrane, and is capable of repetitive testing for several forms of information, such as structural integrity of the pipe's interior or radioactive contamination. As the tool traverses the pipe's interior, this information is transmitted to a data acquisition system. When the system is disengaged, the deployment system, the tether and the characterization tool are used to retrieve the system in reverse order. A vent is provided for equalizing pressure beneath the tubular membrane while retracting the membrane.

49 Claims, 10 Drawing Sheets

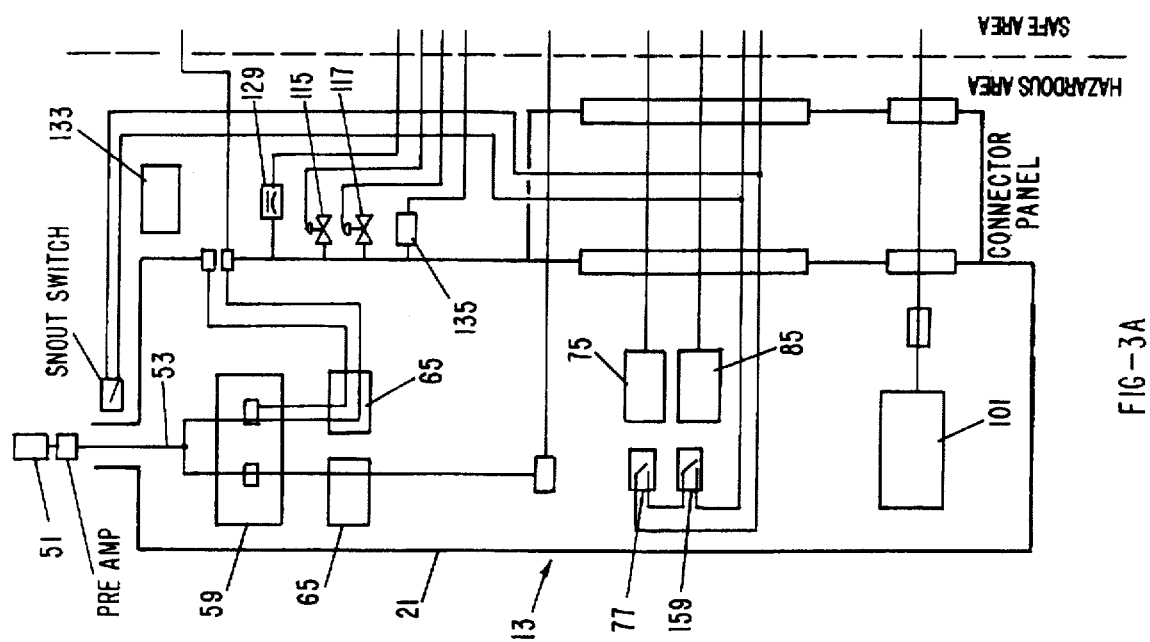

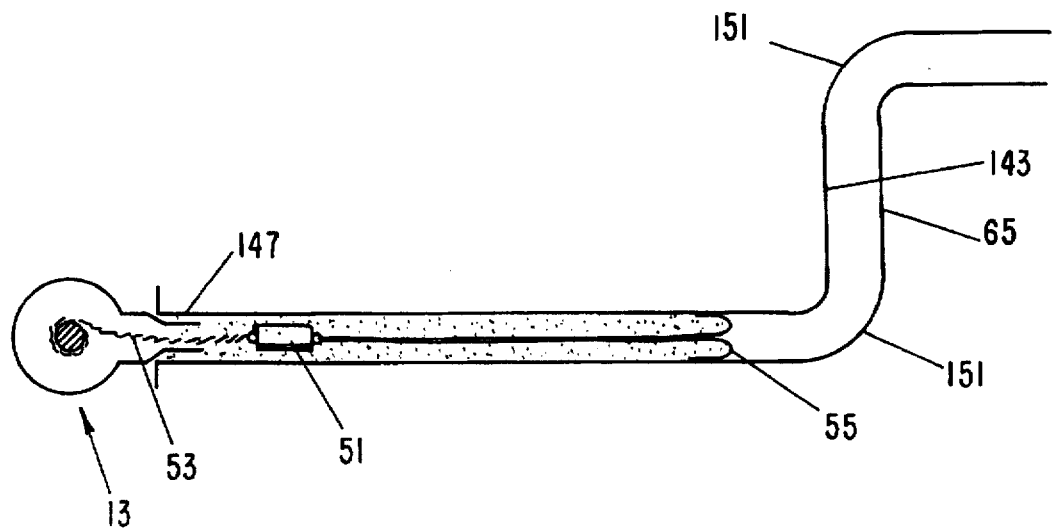
FIG — 7
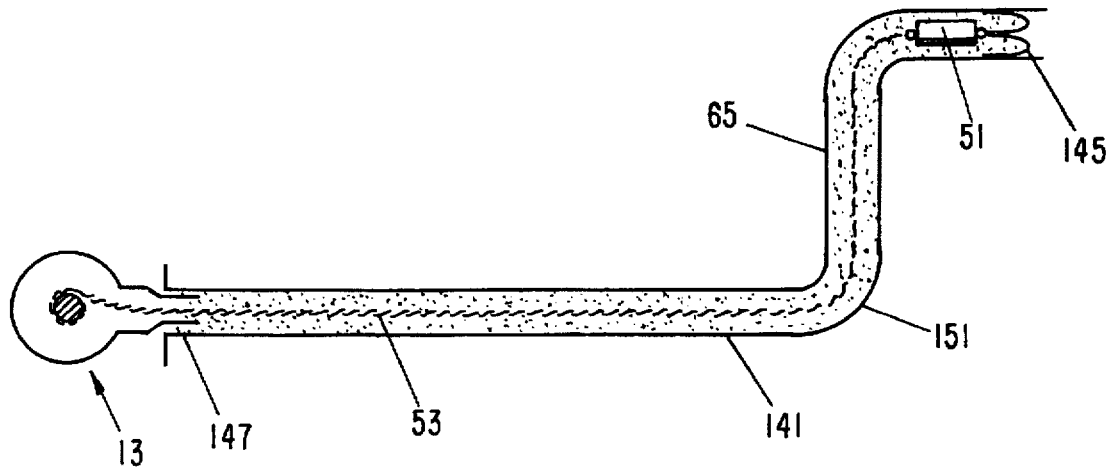
FIG — 8

5,686,674

SYSTEM FOR CHARACTERIZING SURFACES OF PIPES, DUCTS OR SIMILAR STRUCTURES

FIELD OF THE INVENTION

This invention relates to a system for characterizing a pipe, drain line, duct, tank or similar structure with a characterization tool, and more particularly, to a system for accurate detection of the type and location of contamination or surface integrity of such structure. This invention further characterizes pipe or similar structure surfaces where such surfaces are not visible to a user due to the location of the structure, such as when the structure is buried in the ground or located behind a closed edifice such as a wall.

BACKGROUND OF THE INVENTION

Pipes, ducts, drain lines, tanks or similar structures are commonly used to transport or store various fluids, such as oil, gases, water and chemicals, from one location to another. With such fluid transport, the interior surfaces of a structure can become contaminated with residual chemical or radioactive contamination. This residual contamination may taint other fluid which subsequently flows through the structure and may remain on or near the structure's interior surfaces for a prolonged period of time.

This situation is especially problematic at nuclear facilities which are being redesigned or decommissioned. These facilities utilize complex pipe systems to transport radioactive fluids and other potentially hazardous materials. Most of these contaminants have prolonged decay times, thereby requiring decontamination. In many cases, officials at these facilities consider whether existing pipe systems can be salvaged for future use. If the pipes are contaminated in excess of regulatory standards, they must either be decontaminated or treated as hazardous mixed waste. Because technology which would allow the rapid and accurate characterization and inspection of the pipe's interior surfaces is nonexistent, many potentially uncontaminated pipes must be unnecessarily decontaminated or treated as hazardous waste. Furthermore, this is an expensive proposition, as the cost of disposal of low level radioactive waste is substantial.

Three characteristics of radioactive contamination are of interest: 1) activity; 2) energy; and 3) the physical nature of the contamination (pipe-scale, liquid, sludge, solid, etc.). These characteristics impact whether a pipe's internal surface can be characterized. The first two factors affect detection capabilities and limitations. For example, activity defines the lower limit of detectability while emission energy affects the capability to speciate or identify contamination consisting of mixed radioisotopes. The third factor, the physical nature of the contamination, affects the mechanical operation of the system. These forms of radioactive contamination are all potentially present inside of pipes which have been exposed to radioactive fluids.

The U.S. Department of Energy has established radioactive contaminant threshold levels above which material must be considered contaminated. The activity levels range from 20 to 10,000 disintegrations per minute per 100 $cm^2$. The activity levels depend on the source of the radiation and whether it is either fixed or removable.

Prior to the present invention, characterization of contamination within a pipe has been accomplished by passing a hand survey probe over the exterior surface of the potentially contaminated pipe. Several problems exist with this approach, including the possibility of direct human exposure to contamination, the difficulty of obtaining accurate interior surface contamination information from an external location and the constraints of interior physical access to pipes of various size, shape and orientation. For many types of internal contamination, such as alpha or beta radiation sources, the emitted radiation cannot penetrate pipe walls. In this case, radiological surveys from the exterior of the pipe would be ineffective. Additionally, for a complete characterization of the pipe, this approach would necessarily require accessing the entire external length of the pipe. This requirement, however, cannot always be met without some form of earth displacement to access pipes buried underground, or destruction of existing structures in order to access pipes located behind, for example, a wall.

Another prior approach in testing a pipe's interior surface is to manually push or pull a testing system through the interior of a pipe to obtain adequate contamination information. This approach, however, may not succeed in complicated pipe systems such as in those systems which contain elbows or sharp bends, because the system will either likely get stuck, or will be prevented from further travel due to gravitational forces. This approach may further require controlling the testing system from both ends of an open pipe, thereby resulting in either additional manpower or additional equipment located on both ends of the pipe system. Additionally, this approach likely requires the disposal of the detection system simply because after completion of testing, it is also now contaminated. Furthermore, once the detector becomes contaminated with residual material from the pipe's internal surface (such as from liquid material emitting gamma radiation), the detector's signal will always be influenced by this contamination and it can no longer accurately measure the contamination on the surface of the pipe. This approach is cost-prohibitive and nonefficient.

Pipe crawling systems, such as those manufactured by Visual Inspection Technologies, Inc. in Flanders, N.J., are also capable of testing pipe interior surfaces. Motion is accomplished in these systems by the use of tractor treads, wheels, or separate clamps and pistons which allow the system to fasten itself to the pipe's interior surfaces, similar to a caterpillar crawl. These types of systems are slow and cumbersome, and require direct contact of the system with the pipe's interior surface. Because pipe crawlers require traction with the pipe surface to locomote, a pipe surface coated with slippery material or oriented vertically will likely impede its ability to travel through the pipe. Also, because of the direct contact, these types of systems are also subject to immediate contamination from the pipe's interior surfaces, thereby requiring cleaning after use and likely inhibiting its ability to accurately measure the pipe's surface contamination. The tether assembly, which provides power and signal transmission to the detector in a pipe crawler, will also likely become contaminated and require cleaning after use. Furthermore, the fact that the tether and detector become contaminated poses a risk to users of the system if they are required to physically handle the system, resulting in direct exposure to the contaminants if not properly protected.

Further, a common technique for measuring radiation, such as alpha radiation, is to use a thin fill scintillator coupled with a photodetector. For example, a thin film of ZnS(Ag) material can be placed directly over the photosensitive area of a photomultiplier tube. Alpha particles that come in contact with the ZnS(Ag) cause photon (e.g. light energy) emissions from the scintillator which can be detected with the photo-multiplier tube. The fundamental limitation of this detection system is the separation distance between the radiation emitting radioisotope and the detector, since some radioactive particles have a range in air of about three centimeters. This is further compounded by energy loss of the radioactive particle through air. This can severely limit accurate detection of threshold levels of contamination if the energy of the particle is reduced to levels undetectable by the photodetector. Therefore, a detector should preferably be very close to the radiation source in order to make an accurate survey of the contamination. Executing this type of survey is especially difficult in confined spaces such as pipe interiors. Preferably, it is best to directly apply the scintillation material against the pipe surface in order to gain accurate survey information.

Prior to the present invention, membrane technology has been employed to obtain underground geological information. U.S. Pat. No. 5,176,207 to Keller discloses an inverting membrane emplacement technique for soil gas and hydrologic characterization and bore-hole monitoring. This disclosure is useful for soil vapor sampling, liquid sampling and in-situ permeability measurement techniques for unsaturated zone measurements. Applied to the characterization of interior pipe surfaces, this disclosure is deficient because it requires testing instruments to be placed on the outside surface of the membrane in order to obtain geological temperature measurement, pressure measurement, fluid absorption, fluid extraction or fluid insertion. In a radioactive contaminated environment, placement of testing instruments on the outside surface of a membrane necessarily contaminates the instruments.

The present invention provides a simple solution to the problem of obtaining rapid and accurate inspection and characterization information from the interior of a pipe system without substantial cost or risk to users of this invention. A key element of the present invention is its ability to rapidly and accurately position a variety of sensors (such as a gamma detector, an alpha detector, a beta detector, a video camera or a radio beacon) within any type of pipe system by use of a surrounding tubular member, thereby isolating the sensor and its attachments from contamination on the pipe's interior surface, while still allowing measurement of the contamination (e.g., such as gamma and high energy beta radiation transmissions) which can readily penetrate the thin skin of the tubular member.

In addition to detecting the activity levels of radioactive contamination inside of piping systems, the present invention is also intended to be used to identify particular or specific nuclides in a pipe with contamination consisting of a mix of radioisotopes.

The present invention utilizes an inexpensive and disposable tubular membrane which can negotiate sharp bends and turns, can travel horizontally, vertically and through various coordinate locations, and can inspect pipes of smaller diameters and longer lengths than those employed by current pipe crawler technology. Of course, while this system utilizes a sensor (such as a photodetector or radiation detector) to obtain chemical or radionuclide information from the interior of a pipe, it is also capable of simultaneously employing a computer or other specialized electronics within the tubular membrane to evaluate and process the chemical or radionuclide information. The present invention is also capable of transporting a number of other devices inside the pipe when necessary, such as a video camera which is capable of providing a visual inspection of the internal surfaces of a pipe, measuring means capable of providing nondestructive evaluation measurements of the pipe's internal surface, a chemical analysis sensor, a radiation source for structural inspection, and locational means to indicate either the coordinate location of the pipes when such pipes are not clearly visible, or to indicate an accurate coordinate position of the sensor within a pipe. The present invention can also employ a scintillating membrane which is placed directly against a pipe wall so that there is no separation between the wall and the scintillator surface. A photodetector is then transported with the membrane through the pipe to record and/or analyze the light emissions from the scintillator, thereby allowing the photodetector to complete an azimuthal characterization of the pipe interior as the photodetector moves through the pipe.

Accordingly, it is a object of the present invention to provide a system which rapidly and accurately detects or analyzes chemical or radiological contamination within a pipe without accessing the external surface of the pipe.

It is an object of the present invention to provide a system which detects or analyzes chemical or radiological contamination from a specific location within a pipe independent of the pipe's shape, size or orientation.

It is a further object of the present invention to provide a system having a sensor which rapidly and accurately detects or analyzes chemical or radiological contamination within a pipe without the sensor becoming tainted by the pipe's interior surface contamination.

It is also an object of the present invention to provide a system which can perform a radiological survey within any type of pipe system by towing a sensor within a tubular membrane, wherein the sensor is isolated from direct contact with the pipe's interior surface due to a surrounding tubular membrane.

It is also an object of the present invention to provide a system which rapidly and accurately detects or analyzes specific types of nuclear radiation by applying a chemically treated material against a pipe 'surface whereby the radiation emanating from the pipe surface causes the material to generate photon light pulses which are detected by an optical detector transported within the chemically treated material.

It is a further object of the present invention to provide a system capable of identifying and indicating the coordinate location of pipe structures or drain lines generally hidden from the view of users, such as those pipe structures which are buried underground or concealed, by employing a beacon within the tubular member.

It is also an object of the present invention to transport radiation sources inside of pipes for the purpose of external sensors or conducting radiographic analysis.

It is also an object of the present invention to transport inside of pipes characterization tools that are capable of determining the structural integrity and state of the walls of the pipe.

It is also an object of the present invention to provide an expedient and effective method for transporting characterizing tools into pipes, drain lines, ducts, tanks or like structures.

This invention provides the ability to obtain complete characterization information from the interior surfaces of pipe systems and may reduce the number of clean pipe systems which are presently treated as hazardous waste material. The present invention also allows a degree of measurement accuracy and automation unattainable by manual testing methods. The present invention further minimizes user exposure to contaminated materials and also eliminates the need for costly equipment, cleaning or replacement of contaminated radiological sensing devices.

SUMMARY OF THE INVENTION

The present invention involves a system for transporting characterization tools within a pipe by means of an elongated, inflatable flexible tubular membrane which is extendable within the pipe and inflatable to a diameter effective to urge the tubular member against the rigid pipe wall. The tubular membrane member has a first end and a second end, and is initially rolled up and coupled to a reel inside a deployment canister. A tether connects the deployment canister system to a sensing device retained within the tubular member. The tether also includes means for transmitting electronic signals between the sensor and an operational control system. The sensing device is also attached adjacent to the second end of the tubular member. The present invention is controlled by an operational control system. When the system is engaged, pressurized fluid from the deployment canister enters the impermeable tubular member causing the member to invert and distend into and through the pipe's interior. Simultaneously, the attached sensor is towed adjacent to and in substantial parallel travel with the path of the tubular member's second end. In this fashion, the sensor is protected from direct contamination by the surrounding tubular member and is capable of repetitive testing for and recording of chemical or radionuclide contaminant or structural information. Furthermore, due to the operational control system, the sensor can be directly placed at a specific location within the pipe for a detailed examination. As the sensor traverses the pipe's interior, survey information is transmitted through a communication means attached with the tether. As needed, a plurality of signal amplifiers can be incorporated into the communication means to condition the information signals. A remote external analyzing means, part of the operational control system, can be used to process and evaluate the transmitted information signals, as well as control the deployment canister. Alternatively, the deployment canister can be manually controlled if required. When the system is disengaged, the deployment system is depressurized, the reel is operated in reverse fashion and the tether and the sensing device attachments are used to retrieve the membrane in reverse order. A vent is provided for equalizing pressure within the tubular membrane while retracting the membrane.

In another embodiment of the present invention, an instrument capable of analyzing radionuclide information is provided for use in a pipe, including an inflatable flexible tubular membrane. Pressure means act to extend the tubular membrane within the pipe while mining the membrane inside out to form an inflated liner for a pipe's interior surfaces. At least one analyzer is located on the inside of the tubular membrane and is towed through the pipe's interior as the tubular membrane is engaged. The analyzer is capable of in situ chemical or radionuclide information sensing, processing and/or evaluation.

Another embodiment of the present invention includes fabricating the tubular membrane with radiation-sensitive film material or applying radiation-sensitive material to the tubular membrane. The radiation-sensitive material is capable of generating light pulses (or, "scintillation") whenever nuclear radiation emitted from the pipe's internal surface strikes the external surface of the tubular membrane. As the tubular membrane is deployed and becomes in direct contact with a pipe's interior surface, the use of an optical sensor is required for detecting the occurrence of light emissions of radiation particles (such as, for example, alpha or beta particles). As the tubular membrane is inflated, the optical sensor will be towed adjacent to and in substantial parallel travel with the path of the membrane's second end through a pipe to inspect a pipe's interior surface for radionuclide contamination. This embodiment can employ various forms of photodetectors, depending upon operator requirements. This embodiment has several advantages, as it provides a continuous, real time characterization of pipe contamination over a broad range of radiation contamination. Similarly, photodetectors are known expensive components. With the present invention, a seemingly expensive component would be inherently protected from contamination, thereby allowing the operator to re-use the component in future surveys without the need for purchasing additional components.

Another alternate embodiment of the present invention includes transporting a sensing system or transmitting beacon with a tubular membrane through a pipe to thereby allow quantifiable coordinate locating of the pipe if, for example, it is buried or hidden behind an edifice. Pressure means act to extend the tubular membrane within the pipe while mining the membrane inside out to form an inflated liner intimately compressed against a pipe's interior surfaces. At least one analyzing means (e.g., magnetometers, gyroscopes, accelerometers, and/or inertial sensors) is located on the inside of the tubular membrane and is towed through the pipe's interior as the tubular membrane is engaged and inflated. Electromagnetic or radio beacons transported with the tubular membrane internally through the pipe can also be located from the pipe's surface with sensing wands or radio receivers, thereby providing an exact coordinate location of the beacons within the pipe structure.

BRIEF DESCRIPTION OF THE DRAWINGS

FIGS. 3A and 3B are electrical schematic of the present invention;

FIG. 7 is a cross-sectional view of the present invention depicting the interior sensor being towed and transported within a pipe in conjunction with the inflation of the tubular membrane;

FIG. 8 is a cross-sectional view of the present invention with the tubular membrane extended and lining the pipe;

DESCRIPTION OF THE PREFERRED EMBODIMENT

Figure 1:
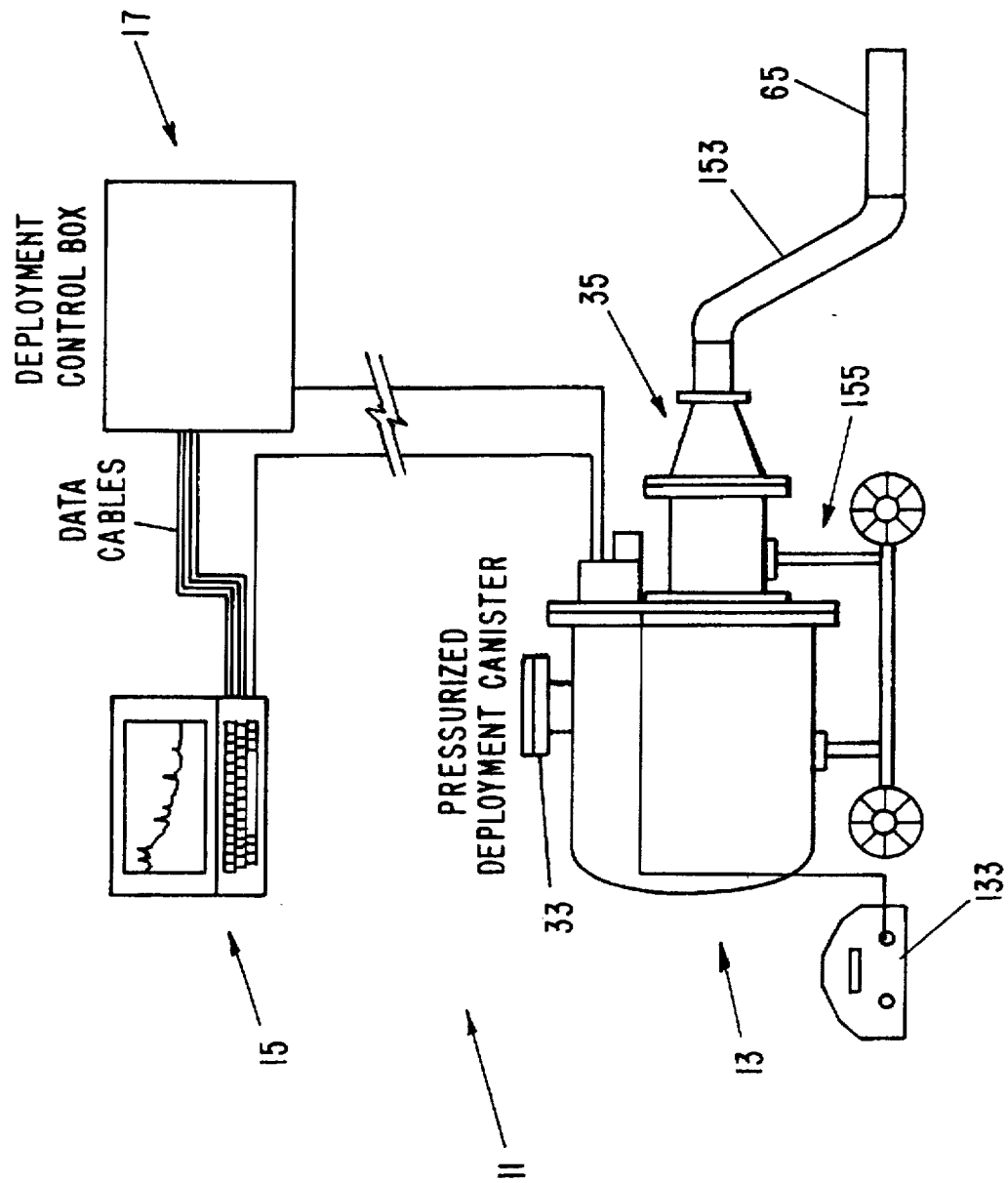
FIG. 1 is a schematic view of the deployment canister, connected to a pipe, deployment control box and data acquisition system of the present invention.

The primary components of the present invention's deployment system 11 are illustrated in FIG. 1. The system consists of major components: (1) pressurizable deployment canister (or housing) 13; (2) data acquisition and analysis system 15; and (3) deployment control system 17.

In a preferred embodiment, canister 13 is constructed of an aluminum cylindrical shell 21 with a 2:1 elliptical head 23 welded on one end and a flange 25 at the other. Mating flange 27 is a flat plate upon which all monitor and control elements as well as spool assembly 29 are mounted. This enables cylindrical shell 21 to be easily removed providing access to all internal assemblies. Cylindrical shell 21 can also be designed to include two 4-inch view ports (one of which is shown at 33) having glass or plexiglass covers for visual inspection of the internal assemblies. Located on the opposing side of flange 27 is snout 35. Canister 13 is designed to withstand pressures as high as 50 pounds per square inch in order to utilize the present invention in long pipes with numerous elbows and provides the positive fluid pressure required to pressurize membrane 55. Similarly, such pressures (e.g. up to 50 psi) may be required for smaller diameter pipes (e.g., less than 2 inches in diameter).

Figure 2:
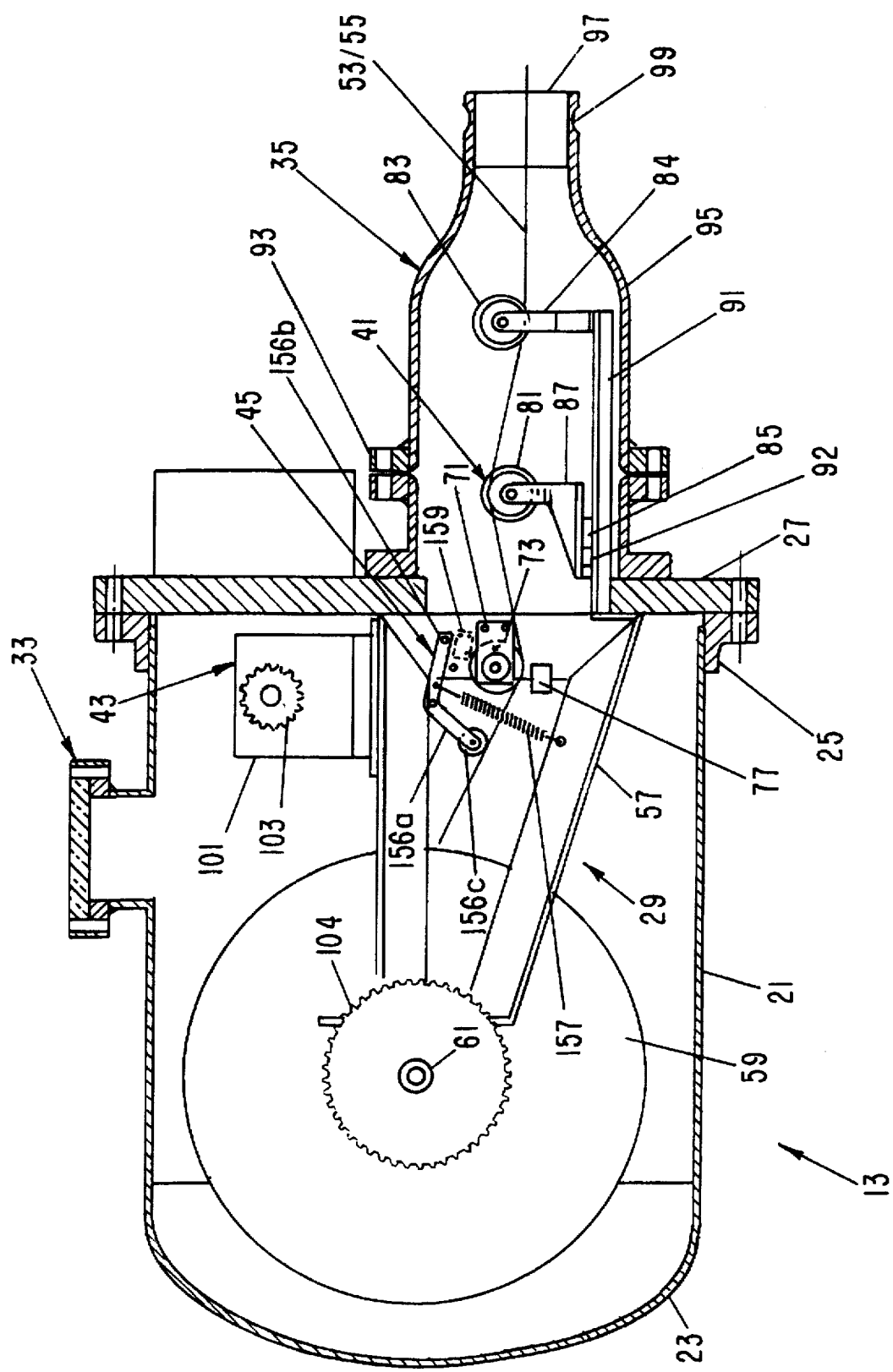
FIG. 2 is a cross-sectional view of the deployment canister assembly of the present invention.

As seen in FIG. 2, deployment canister 13 houses four major components: (1) spool assembly 29; (2) tension indicator assembly 41; (3) direct current (dc) motor and gear reduction system 43; and (4) slack indicator 45.

Spool assembly 29, is designed to retain sensor 51 (as shown in FIGS. 7 and 8) as well as hold a predetermined length of tether 53 and a predetermined length of membrane material 55. Spool assembly 29 includes a support bracket 57 and spool 59. Spool 59 is mounted on hollow shaft 61 and supported with pillow block bearings (not shown) to allow for spool rotation during operation. Conventional electrical lines (not shown) from sensor 51 are routed through the hollow portion of shaft 61 and connected to conventional slip ring assemblies 65 (schematically illustrated in FIG. 3A) mounted on each end of shaft 61. Such electrical lines are passed through the wall of canister 13 in a conventional manner as to retain pressure within canister 13, as illustrated schematically in FIG. 3A.

Tension indicator mechanism 41 and slack indicator 45 include a totalizing roller assembly 71, including roller 73. Totalizing roller assembly 71 is designed to provide reference for location information as membrane 55 inverts and is driven into pipe 65 (as explained in greater detail below), and includes a conventional rotary encoder (illustrated as 75 in FIG. 3A) which provides membrane and detector deployment rate and position. When deployment of the present invention is initiated, membrane 55 is routed over totalizing roller assembly 71. Due to the inverting membrane process, the rate at which membrane 55 is deployed is half as fast as the deployment rate of sensor 51. In order to accurately position sensor 51 in pipe 65, a reference position is indicated by limit switch 77 mounted directly below totalizing roller assembly 71. As sensor 51 passes over roller 73, limit switch 77 triggers an electrical signal which is sent to deployment control system 17. Deployment control system 17 then starts a new counting sequence which directly relates to the deployed depth of sensor 51 within pipe 65. This design allows for accurate coordination of sensor output versus sensor (or other characterization and/or inspection tool) position.

Tension indicator assembly 41 is designed to provide a measurement of the tension in membrane 55 and tether 53 during deployment and retrieval of membrane 55 in pipe 65. Tension indicator assembly 41 consists of two rollers 81 and 83 working in conjunction with roller 73 to create a downward force on center roller 81 proportional to that of the tension in tether 53 or tubular membrane 55. Positioned directly under center roller 81 is load cell 85 selected to measure a range from 0 to 100 pounds. Depending on the membrane material employed, a wide range of elastic limits may be encountered. Tension indicator assembly 41 is designed to accommodate this wide range of elastic limits. These predetermined tension limits will be programmed into deployment control system 17 so that deployment control system 17 interrupts operation of motor DC 101 if these limits are exceeded. Rollers 81 and 83 are, as illustrated in FIG. 2, supported by brackets 87, 89 and 91, within the interior of snout 35. As illustrated, bracket 87 is hinged to bracket 91 at hinge 92. As also illustrated in FIG. 2, snout 35 includes a flanged base portion 93 and a flanged neck or snout 95 having an open end 97 and groove 99 for a coupler (not shown). Groove 99 and the coupler 99 can be used to seal first end of membrane 55 to deployment canister or to attach extension device 160 to canister 13.

The primary consideration in the selection of dc variable speed motor assembly 43 is the determination of the maximum torque and retrieval rate of the system. During deployment, the force required to tow sensor 51 through pipe 65 is provided by the positive fluid pressure from deployment canister 13. During the retrieval process, motor 101 is responsible for withdrawing tether 53, sensor 51 and membrane 55 from pipe 65 back into canister 13. The force required to retrieve these components is slightly greater than the deployment force because membrane 55 must remain inflated to 0.5 psi, which creates an added resistive force that motor 101 must overcome. If fluid pressure within membrane 55 drops below the 0.5 psi level during retrieval, membrane 55 could collect at an inversion point causing membrane 55 to lodge itself in pipe 65. The factors relating to the total resistive force motor 101 must overcome is a function of the coefficients of friction of membrane 55 on itself, membrane 55 on tether 53, as well as the number of elbows encountered in pipe 65. As those skilled in the art will appreciate, motor 101 should be designed to handle the highest load depending on the pipe system encountered.

For example, in a 200 foot, 2-inch pipe system having four elbows, approximately 50 to 60 pounds of tether tension is required to retrieve membrane 55. Since the effective diameter of spool 59 changes with the amount of membrane 55 retrieved, the maximum anticipated linear resistance acting tangentially to the required maximum spool radius of 9 inches must be examined. Applying a maximum spool radius of 9 inches equates to a required torque of 540 in-lbs. In this case, the motor selected for these limitations would be a ¼ horsepower, 250 in-lbs gear motor with a rotational speed of 1–42 rpm. This motor is coupled to spool shaft 61 via sprockets 103, 104 and chain drive (not shown); which provides a 3:1 gear ratio, providing an increase in the available torque at the spool shaft to 750 in-lbs at a rotational speed of 0.33–14 RPM.

The physical characteristics of conventional piping systems (such as pipe diameter, length of piping run, number of elbows, and similar obstructions) also provides the dominant constraints on the operational requirements of a system capable of characterizing a pipe's interior surface. Of these, the pipe diameter is the most important, since the pressure at the end of membrane 55 which drives both the membrane 55 and sensor 51 into pipe 65 is proportional to the pipe radius squared. For example, to emplace a given sensor into a 2-inch diameter pipe requires four times more pressure than to emplace a sensor in a 4-inch diameter pipe. Therefore, the smaller the pipe diameter, the higher the design pressure capability required of the deployment canister.

As such, and as those of skill in the art can appreciate, management of pressure is essential to successful deployment and retrieval the present invention. Relatively high pressure is needed to deploy membrane. 55 because fluid pressure provides the motive force for carrying sensor 51 through pipe 65. When elbows or obstructions are encountered by membrane 55 or sensor 51, the deployment fluid pressure must be increased. Similarly, when retrieving membrane 55 and sensor 51 from pipe 65, adequate pressure must be maintained to ensure that membrane 55 inverts. If membrane 55 did not properly invert, but was partially pulled through pipe 65, then membrane 55 might tear, potentially contaminating sensor 51 and/or tether 53.

Figure 4:
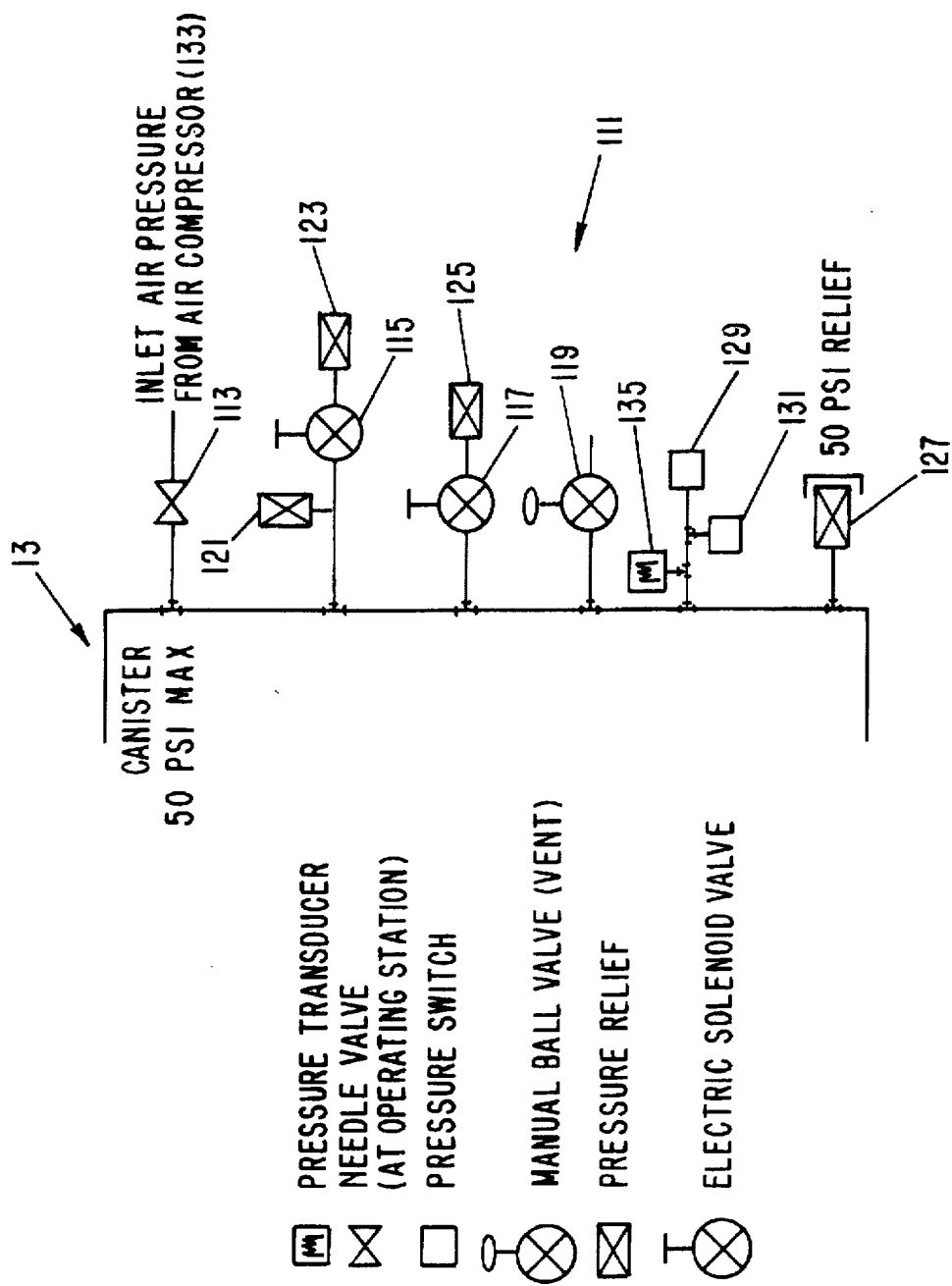
FIG. 4 is a schematic for the pressure management system of the present invention.
Figure 5:
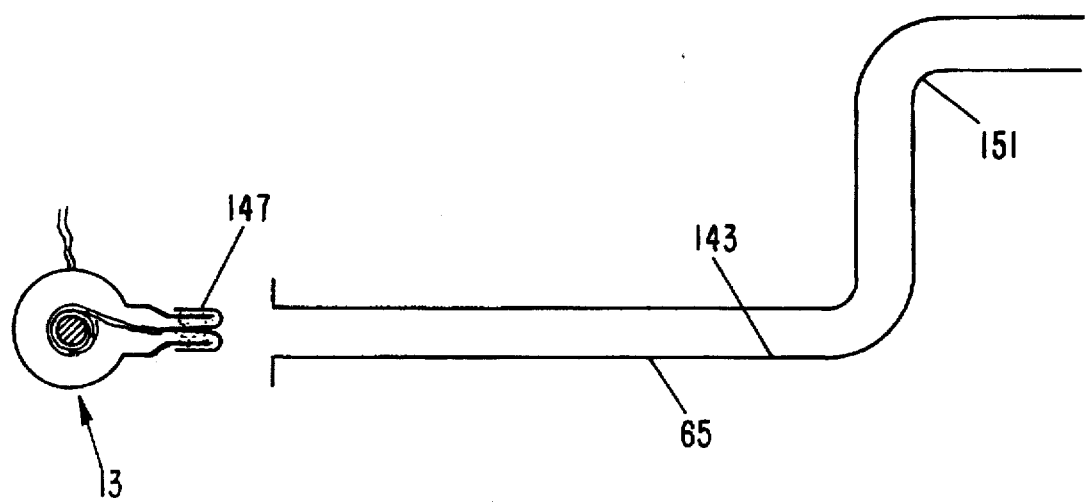
FIG. 5 is a cross-sectional view of the present invention prior to engagement with an opening of a pipe.
Figure 6:
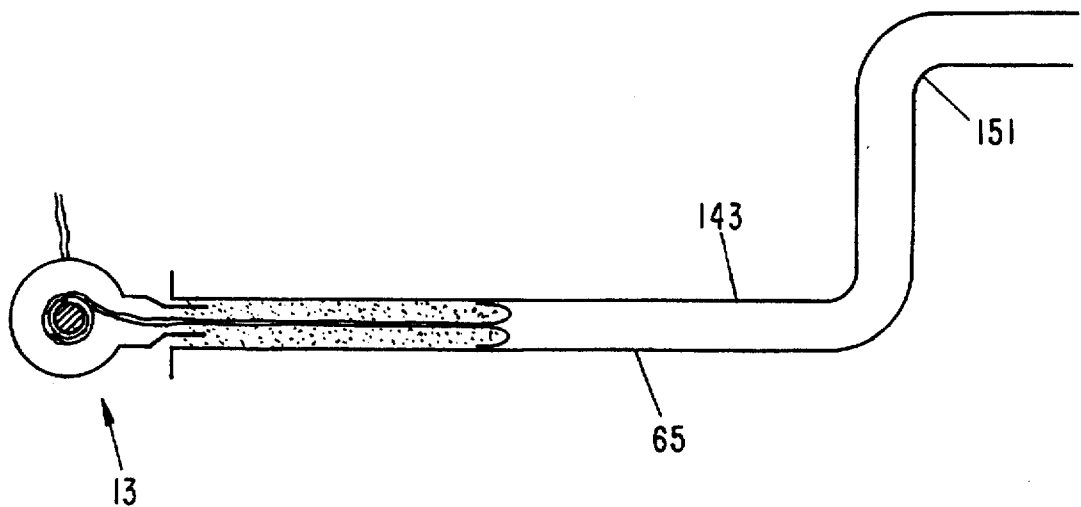
FIG. 6 is a cross-sectional view of the present invention attached to an opening of a pipe with the tubular membrane partially inflated and driven into the pipe.
Figure 9:
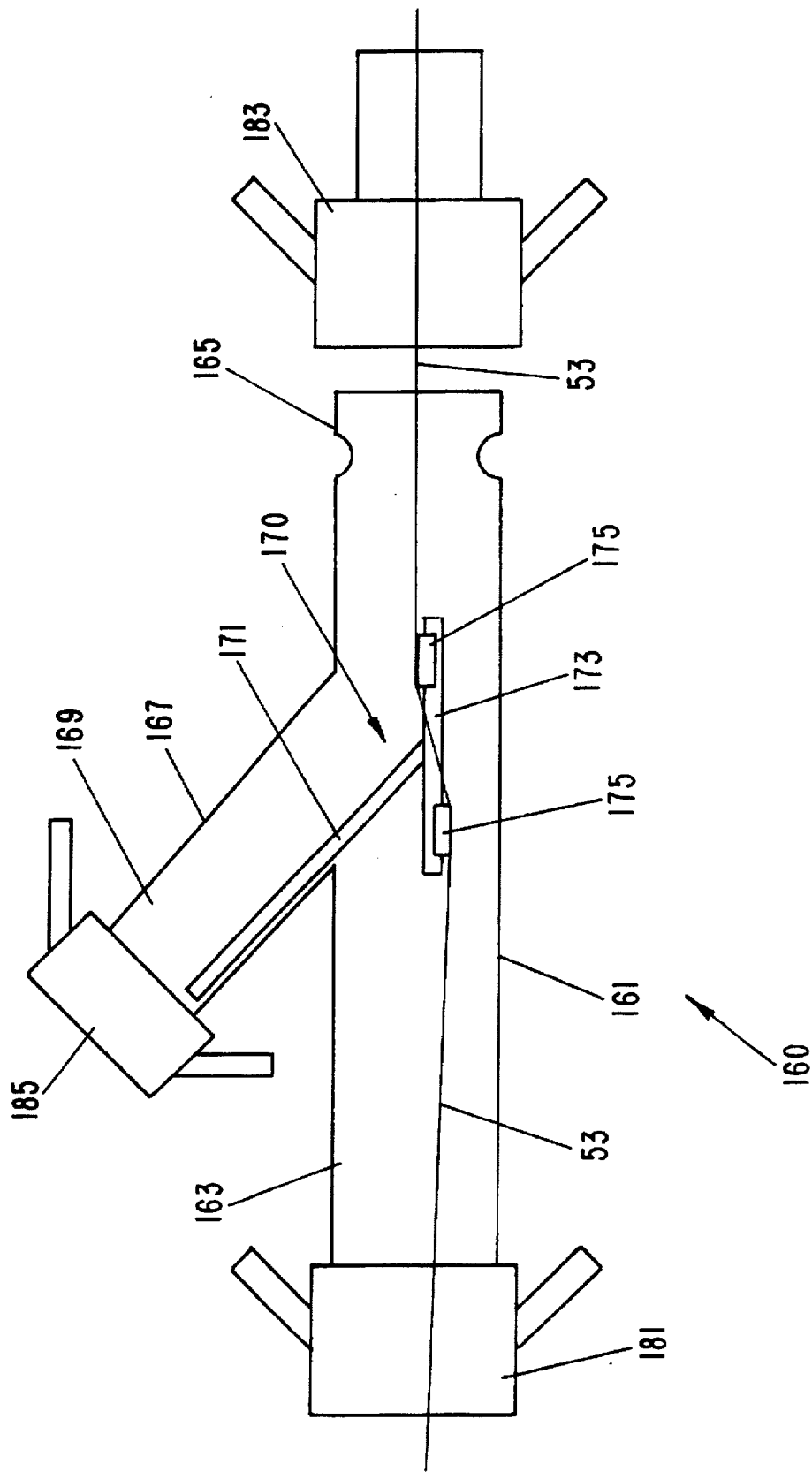
FIG. 9 is a schematic cross-sectional view of the canister extension and tether swipe of the present invention.

As seen in FIG. 4, the primary components of pressure management system 111 consist of four valves 113, 115, 117 and 119; four relief valves 121, 123, 125 and 127;, and two pressure switches 129 and 131. Except for control valve 113, all of these components are located on the deployment canister. Control valve 113 is located at compressor 133 and controls the flow of fluid from compressor 133 to canister 13. Compressor 133 is of conventional design such as a positive displacement air compressor. Alternately, as those of skill in the art will appreciate, any pressurized fluid can be used.

Valves 115 and 117, which may be characterized as membrane deployment valves, are solenoid valves which are remotely operated from deployment control system 17. Membrane deployment valve 115 is initially open while valves 117 and 119 are closed. Valve 119 remains closed throughout the operation, as its only purpose is for rapid manual venting of canister 13 should it be required. Valve 113 is opened to pressurize canister 13 up to a predetermined nominal operating pressure set by relief valve 123. Preferably, the operating pressure will be in the range of 5–20 psi.

When deploying membrane 55, such deployment pressure continues as long as no additional pressure is needed in membrane 55 (additional pressure may be needed for deploying the membrane around obstacles or through elbows in the pipe). If more pressure is needed, valve 115 is closed so that an upper predetermined operating pressure is set by relief valve 121. Preferably, the upper operating pressure will be approximately two times the pressure set point of 123. Valve 113 is then further opened until adequate pressure is reached to deploy the membrane. Similarly, when retrieving membrane 55, valve 117 is opened so that the fluid pressure will be maintained at a nominal 0.5–1.0 psi cracking pressure of relief valve 125. Valve 115 will also be opened so that relief valve 123 can provide additional relief if the fluid flow through 125 is not adequate.

Canister 13 is equipped with a pressure relief valve 127 set at the maximum operating pressure of 50 psi. Valve 119 also allows for manual venting of canister 13. Pressure switch 129 is set at a predetermined operating pressure and will vary depending on the application. The second pressure switch 131 is preferably set at the maximum operating pressure of 50 psi. A pressure transducer 135 attached to canister 13 transmits canister pressure to control system.

The most important component of the present invention is tubular membrane 55. Initially, tubular membrane 55 is coiled inside of pressure-tight deployment canister 13. Tubular membrane 55 is constructed of a material that is impermeable to fluid and can be inflated, i.e., pressurized, to invert membrane 55 on itself and to drive it into pipe 65 and to force the membrane's external surface 141 against pipe surface 143. Membrane 55 can be constructed from, for example, polyethylene, urethane, polyvinyl or nylon. As depicted in FIG. 8, tubular membrane 55 has second end 145 and first end 147. Second end 145 is attached to sensor 51.

First end 147 of tubular membrane 55, which protrudes from coupling 95, is folded over opening 97 and attached to groove 99 by cam-operated couplings. When deployment canister 13 is pressurized via compressor 133 in this configuration, the pressure force on the protruding portion of tubular membrane 55 causes membrane 55 to extract itself from spool 59 and also causes membrane 55 to be inverted into pipe 65. As this process continues, membrane 55 lines pipe 65 and is applied against pipe interior surface 143. Sensor 51 is attached between proximal end 145 of tubular membrane 55. As tubular membrane 55 continues to invert into pipe 65, sensor 51 subsequently moves off spool 59 and is similarly towed into pipe 65 where it is safely protected from contamination in pipe 65 by membrane 55. To retrieve membrane 55, sensor 51 and tether 53, the process is reversed, allowing tether 53, sensor 51, and membrane 55 to be wound back onto spool 59 via motor 101. This unique deployment and retrieval method allows sensor 55 to be moved back and forth through a pipe system in order to provide high resolution analysis of the location of contaminating radionuclides on piping walls, while also protecting the sensor from contamination. The foregoing is graphically illustrated in FIGS. 5–8, which include pipe 65 and elbows 151. To connect snout 35 with pipe an extension 153 may be utilized on, as described below, a canister extension. As also shown in FIG. 1, a cart 155 may also be provided.

Figure 3B:
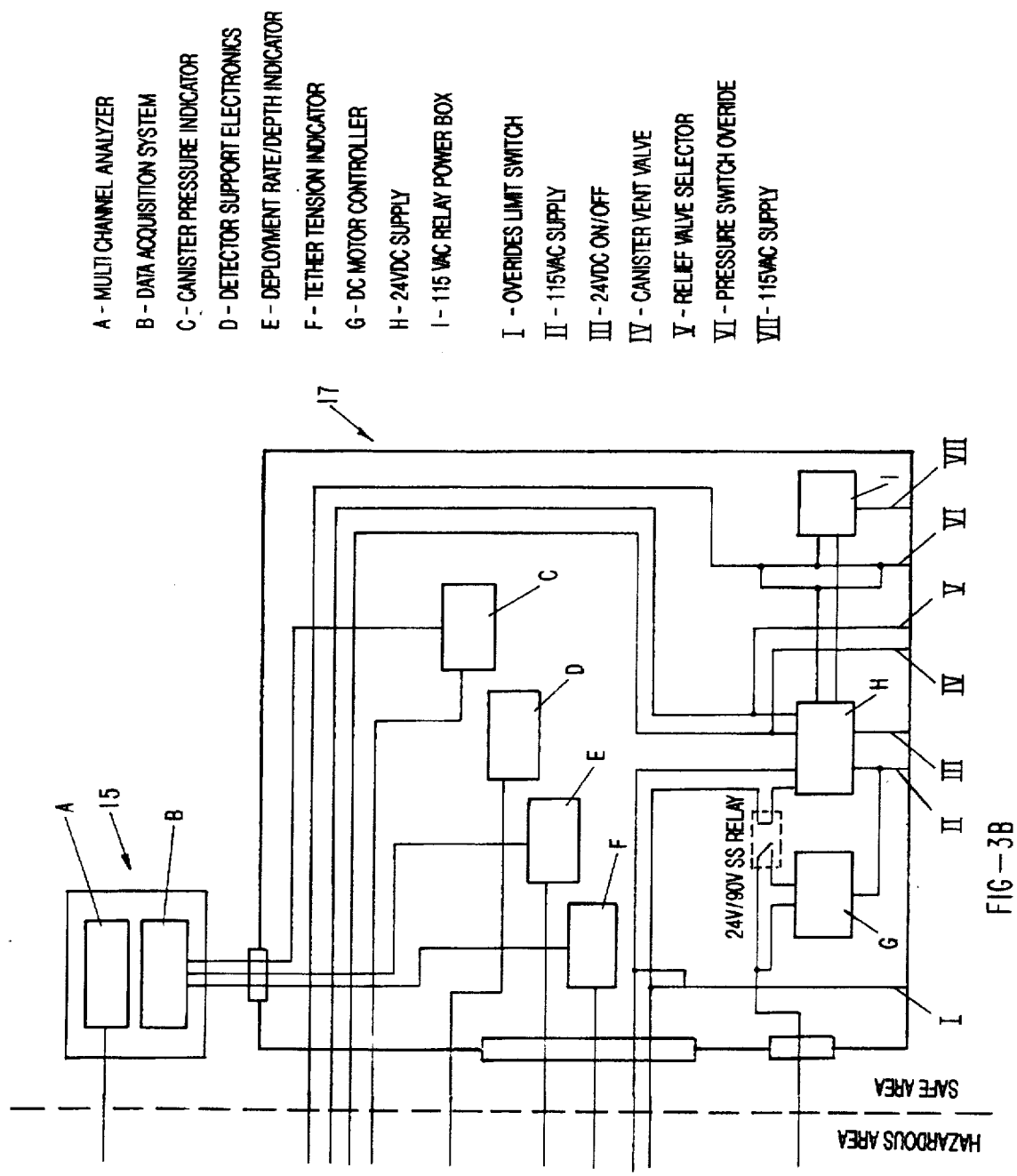

During deployment, tether 53 and/or membrane 55 may encounter a slack condition due to either motor 101 deploying membrane 55 faster than the pressure force can drive membrane 55 into pipe 65, or sensor 51 encountering an obstruction too large for it to overcome. In either event, operation of motor 101 will need to be interrupted so as not to create a build up or collection of unspooled material in the internal portion of canister 13. This condition will also likely introduce an error in rotary encoder 75 because tether 53 or membrane 55 would no longer be in contact with roller 73. As seen in FIG. 2, this problem is overcome by the use of slack indicator 45 located directly above totalizing roller assembly 71. Slack indicator arm 156a is pivotally mounted at 156b and includes a roller 156c which is biased into engagement with membrane 55 by spring 157 just before it reaches totalizing roller assembly 71. If slack indicator arm 156a is pulled below the position indicated in FIG. 2 (thereby indicating a slack condition), limit switch 159, which is electrically connected in series with motor 101, is tripped open, thereby interrupting the operation of motor 101 until the slack is taken up or other corrective action is taken. Additionally, as illustrated in FIG. 3B, an override limit switch, located on deployment control system 17, can be employed to override the motor operation if necessary.

In some applications, sensor 51 is too large or too fragile to be installed on spool 59. In these cases, extension device 160 is particularly useful to allow an operator to install or withdraw such sensors. Optional extension device 160 allows an operator to access tether 53, sensor 51 or membrane 55 at a convenient location during operation of the present invention. Extension device 160 includes first elongated, cylindrical portion 161 having canister attachment end 163 and pipe attachment end 165. Extension device further includes a second elongated, cylindrical portion 167 having access end 169. Extension device 160 couples to canister 13 through first cam lever couple 181, and similarly couples to pipe 65 via a second cam lever couple 183. First cam lever couple 181 is securely attached to first cylindrical portion 161 at canister attachment end 163. Pressure-tight cam lever couple 185 is also securely attachable to access end 169. First cam lever couple 181, second cam lever couple 183 and pressure-tight cam lever couple 185 are all of conventional design.

In some applications, membrane 55 may tear or rip, thereby exposing tether 53 and sensor 51 to contamination at a location unknown to the operator. As such, tether swipe 170 may be employed to examine whether tether 53 is contaminated. In many cases, use of tether swipe 170 is mandated by health physics standards. Tether swipe 170 includes rigid stabilizing portion 171 attached to swipe support portion 173. Both rigid stabilizing portion 171 and swipe support portion 173 can be made from any suitable rigid material such as aluminum or PVC. Tether swipe 170 also includes at least one conventional smear 175 attached to swipe support portion 173 by any conventional means such as adhesive. When tether swipe 170 is employed, an operator can access tether 53 by disengaging pressure-tight cam lever couple 185 and mounting rigid stabilizing portion 171 to extension device 160 and coupling tether 53 to swipe support portion 173. Importantly, smear 175 should directly engage tether 53. After replacing pressure-tight cam lever couple 185, membrane 55 is withdrawn from pipe 65. As membrane 55 is withdrawn, portions of tether 53 will directly contact smear 175. Before sensor 51 engages smear 175, motor 101 is interrupted in order to allow an operator to remove pressure-tight cam lever couple 185 and detach tether swipe 170 from rigid stabilizing portion 171. Smear 175 can then be removed from swipe support portion 173 and independently be tested for contamination.

As depicted in FIGS. 1 and 3, deployment control system 17 allows users to control fluid pressure, the deployment rate and direction of deployment of membrane 55 and sensor 51. Deployment control system 17 can regulate and provide information on several key parameters, including fluid pressure, tether tension, sensor location and membrane deployment rate. Acquisition system 15 is designed to acquire, process and store radiological or chemical contaminant information. System 15 can include a data analysis device, a computer, a spectrum analyzer, an analog to digital converter, a digital to analog converter or any similar form of electronics. These components are typically located away from the canister 13 for remote operation of the present invention. Remotely locating these instruments has the advantage of allowing an operator to obtain information from pipe 65 with little or no radiation exposure.

In one form, data acquisition system 15 is a computer mounted to a docking station (not shown) which, in the preferred embodiment, utilizes two specialized electronic cards. One card is a Canberra Accuspec/NaI Plus board, which is a 2048 channel multi-channel analyzer card. This card is used to acquire and analyze the spectral data received from the sensor 51 (for gamma radiation detection) in pipe 65 and to measure gross count rates. It also controls the pre-amplifier (if used) and controls the power required of a photo multiplier tube (PMT). The second electronics card in the docking station is an AT-MIO-16 data acquisition card from National Instruments. This card records deployment parameters so that radiological data can be correlated to the pipe being inspected. The most important data to examine is the output from the sensor deployment depth and deployment rate counter. This data provides information on positioning of the sensor inside a pipe. In addition, data reflecting the history of the deployment process is recorded. This includes the history of both the canister and membrane pressure recorded from a pressure transducer mounted on the canister (see FIGS. 3 and 4), the tether tension recorded from loadcell 85 (as seen in FIG. 2) and the membrane deployment depth recorded from rotary encoder 75 in canister 13. As those of skill in the art can appreciate, data acquisition system 15 can be remotely placed outside of pipe 65 in highly contaminated environments, thereby protecting users from the contramination. Similarly, data acquisition system 15 can be placed within membrane 55.

All deployment control is operated from deployment control box. As seen in FIGS. 1 and 3, the controls on interface regulate motor speed and direction, fluid supply, solenoid valves 115 and 117, and sensor power. Interface control panel 17 can also include a canister pressure gauge, a tether tension indicator, a membrane deployment depth indicator, and a detector/sensor deployment depth/rate indicator. As those skilled in the art can appreciate, additional devices can also be included, depending on the application. All of these components provide an operator with immediate feedback information on the deployment process.

Several automatic control features are also included in the deployment control system 17. Snout switch as seen in FIG. 3A mounted on membrane conduit 153 is connected to limit switch 159 so that motor 101 is disengaged if the pressure in membrane 55 is too low. It also functions as a limit switch when membrane 55 is retrieved, since the switch's response to the membrane being retrieved past the switch is the same as if the membrane becomes under-pressurized. The automatic control feature for motor 101 is a limit switch 77 attached to slack indicator arm 45. If a slack condition exists during deployment, indicator arm 45 will open limit switch 77, which is wired in series with motor 101, and thereby interrupts motor power.

In use, deployment canister 13 is positioned at opening of pipe 65 (as seen in FIGS. 5–8). Within deployment canister 13 is tubular membrane 55, sensor 51 and tether 53. Tubular membrane 55 is rolled up within deployment canister 13 on reel spool 59. Tubular membrane 55 terminates at a first end 147 which is attached to deployment canister 13. Preferably, tubular membrane 55 is oversized by 20 to 50 percent of the pipe diameter (e.g., such as a 0.004 inch thick, 100 percent low density polyethylene membrane). This size of membrane is preferable, as it is tear resistant which is a quality desirable when encountering sharp edges or obstructions which could destroy a membrane. In some applications, such as pipes containing residual fluids, it is desirable to use undersized membranes. Tubular membrane 55 is securely attached to open end of canister 65 by any conventional fastening means (shown generally in FIGS. 5–8).

In an alternate embodiment of the present invention as a method for detecting low energy beta radiation, or alpha radiation, a scintillating material is incorporated with membrane 55. A wide variety of luminescent materials can be used to achieve this purpose such as $ZnS(Ag)$, $ZnS(Cu)$, $CdS(Ag)$, $CaWO_4$, NaI-Th; Diphearyl, and Anthracene. These materials can be incorporated into or with the inverting membrane in several ways. For example, with membranes that are made by extrusion, the material can be mixed with the raw membrane material prior to extrusion. The extruded membrane then has the scintillating compound evenly distributed within. As another example, strips of the scintillating material may be adhered to the exterior surface of membrane 55.

Figure 10:
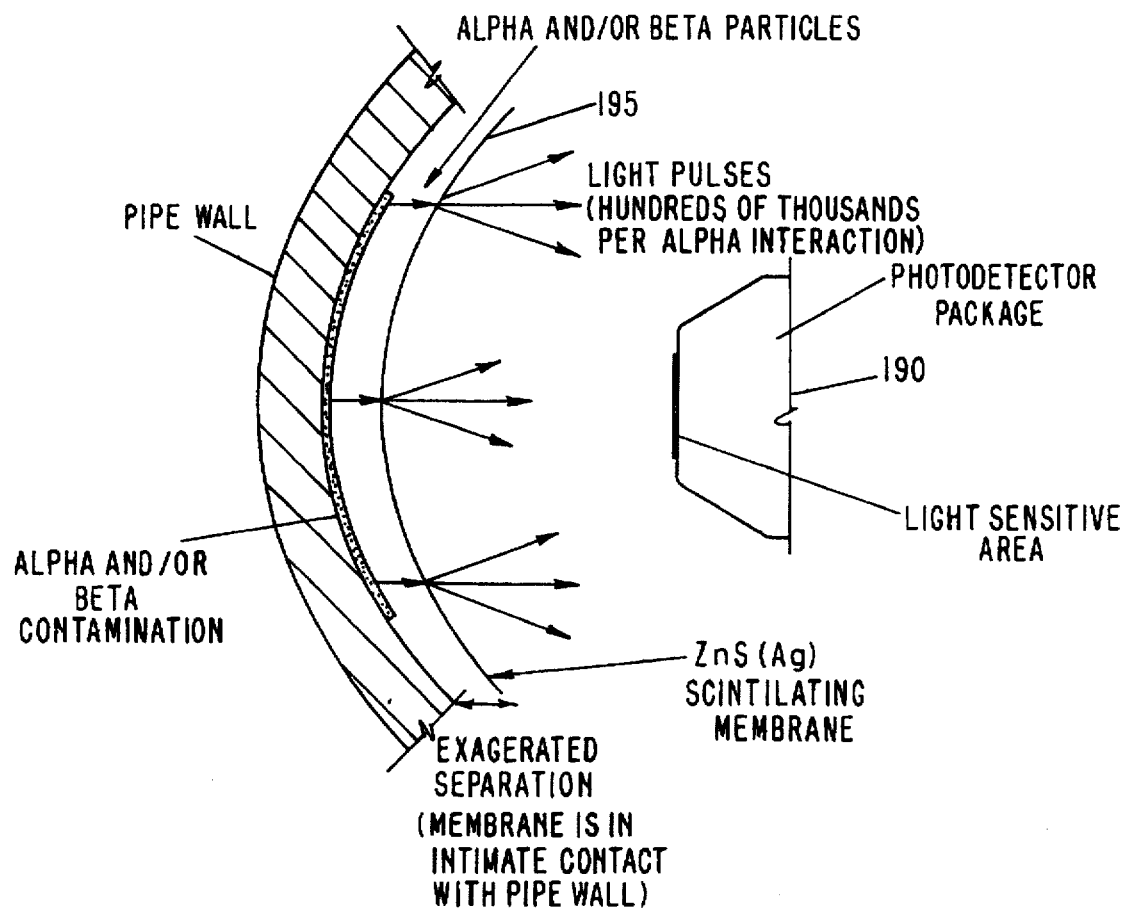
FIG. 10 is a close-up view of the scintillating membrane alternate embodiment of the present invention.

As seen in FIG. 10, to detect light emissions from the scintillating materials, photo detector 190 is used which is compatible in its sensitivity to the scintillation material used. An important consideration in choice of a photodiode is its spectral sensitivity, which is a measure of the output of the photodetector per unit incident light on the detector as a function of the light's wavelength. Most scintillating materials produce light output in the 450 nanometer range. Compact photomultiplier tubes are well suited for these wavelengths. Most silicon photodiodes operate in the 800 to 900 nanometer wavelength. While this discrepancy exists between the optimum wavelength of photodiodes and the light response of scintillating materials, the spectral response of photodetectors is generally suitable to chose a photodetector of sufficient sensitivity.

Another characteristic of photodetectors which must be considered is the time response of the detector. In the present invention, this response must be fast enough to detect any light pulses emitted from a scintillating membrane. For example, ZnS(Ag) emits a light pulse with a decay time constant of 0.25 microseconds. Therefore, in order for a detector to observe this pulse, it must have a rise and fall time shorter than the 0.25 microseconds time constant. Examples of photodetectors which have the proper spectral and time response include bialkali photocathodes, compact bialkali photocathodes, silicon avalanche photodiodes, long line silicon photodiodes. Additional available photodetectors include microchannel plate detectors and charge coupled device (CCD) detectors.

A final factor to consider in the choice of photodetector employed is the package size. Several package size options exist, including wide angle view detectors to very narrow view detectors. These options, as those skilled in the art will know, come in a variety of shapes and sizes. Optimally, it would be preferred to employ an omnidirectional photodetector which is capable of long-range and short-range light pulses. In this regard, such a device could obtain light pulse information emanating adjacent to its immediate location in the pipe as well as emanating from a distance. Such technology, however, is unavailable. Nevertheless, it is preferred to obtain light pulse information in the adjacent location to the photodetector.

Radiological detection is accomplished with standard off-the-shelf hardware. For instance, gamma-ray spectroscopy has been accomplished with the system using an Accu-Spec Nat Plus board from Canberra Industries, Inc. of Meriden, Conn. Traditional radiological measurement in the form of Nuclear Instrumentation Modules (NIM) measurement electronics have also been used which process the signals from the employed photodetector. The NIM bin houses the power supply required for the photodetector, houses a pulse shaping amplifier and a ratemeter. These components can include components from Canberra Industries, model 2022 Amplifier, model 2030 single channel analyzer, and model 3102D high voltage power supply. Rate meters should be capable of analog output for recording of signals into a computer. Such ratemeters are found from Oxford/Teunelec of Oak Ridge, Tenn. (models TC525 and TC527).

Figure 12:
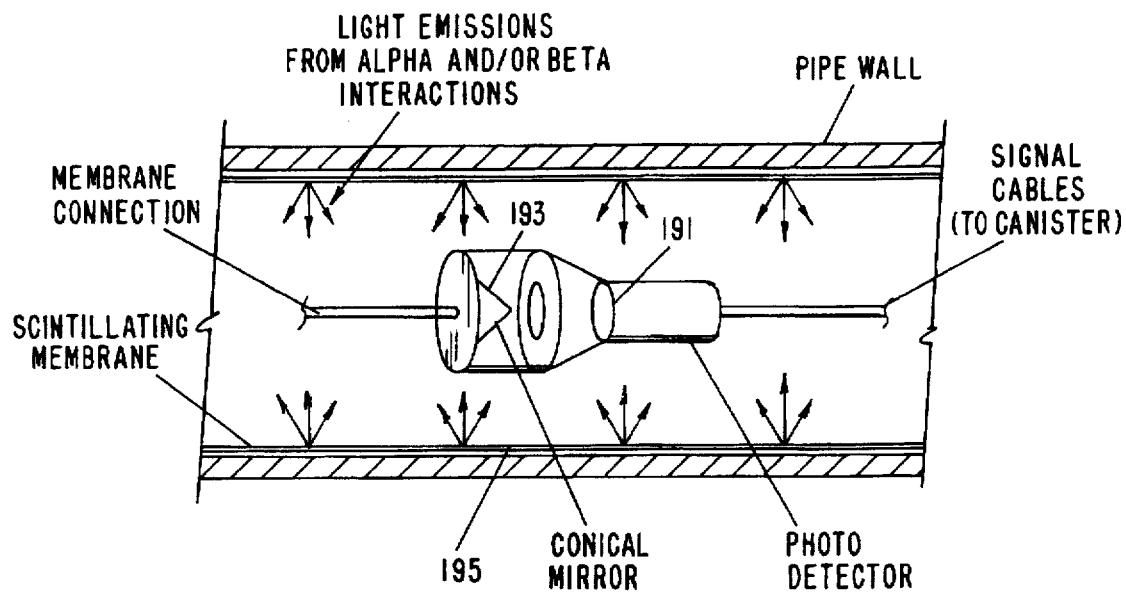
FIG. 12 is a partial side view of another alternate sensor within a pipe of the embodiment in FIG. 10.

As seen in FIG. 12, an alternate embodiment includes a single large area photodetector sensor 191 mounted on the front of a cylindrical package (such as a compact photomultiplier tube). Attached to photodetector sensor 191 is a conical mirror 193 which reflects light emissions from the scintillating material to the photodetector surface. This embodiment enables the complete azimuthal detection of the light pulses emanating from the scintillating material 195. Additionally, a collimator (not shown) could be employed to limit the longitudinal view of the photosensor. With the addition of the collimator, the resulting sensor would have a high degree of resolution of the location of radiation contamination within a pipe.

Figure 11:
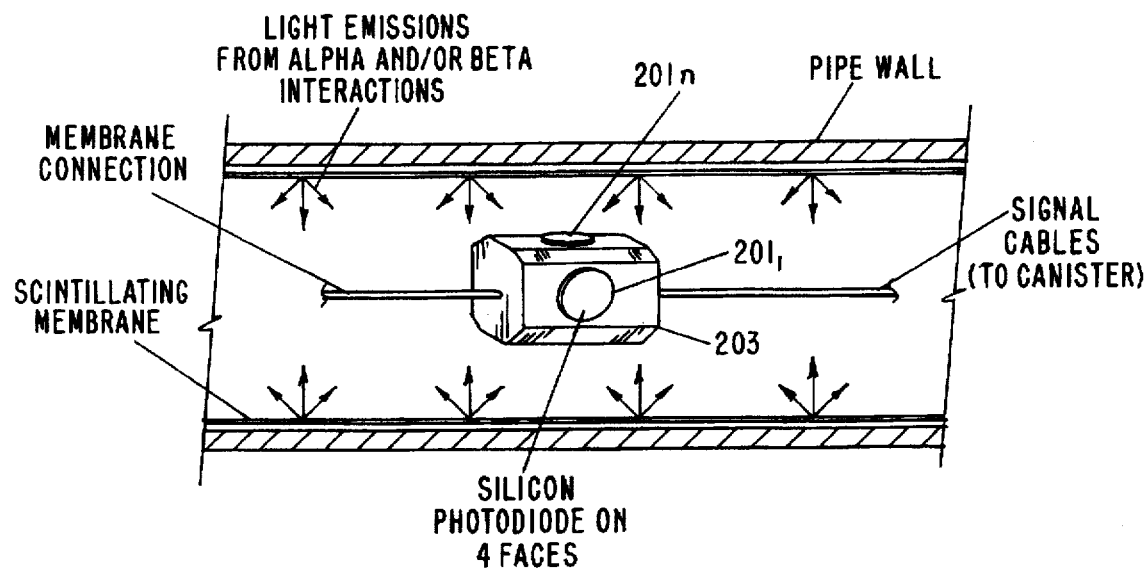
FIG. 11 is a partial side view of an alternate sensor within a pipe of the embodiment in FIG. 10.

FIG. 11 depicts another alternate sensor having an array of photosensors $201_1$, $201_2$. Photosensor array $201_1$, $201_2$ is mounted on an external circumference of a cylindrical package 203. This design enables higher sensitivity azimuthal viewing of emissions immediately adjacent to the sensor.

Whereas the drawings and accompanying description have shown and described the preferred embodiment of the present invention, it should be apparent to those skilled in the art that various changes may be made in the form of the invention without 34 affecting the scope thereof.

What we claim is:

1. A system for transporting a characterization tool in a pipe, said system comprising:
   a. an elongated, inflatable impermeable membrane, said membrane having first and second ends;
   b. a housing, said housing including,
      i. means for supporting said membrane in said housing, and
      ii. means for coupling said housing to said pipe;
   c. means for attaching said first end to said housing;
   d. means for pressurizing said membrane, to inflate, invert and drive said membrane into said pipe;
   e. means for characterizing at least interior portions of said pipe, said means for characterizing including a characterization tool, means to determine characterization tool deployment rate into and position in said pipe, and a data acquisition system coupled to said characterization tool, said characterization tool secured to said second end of said membrane whereby, as said membrane is being inflated and driven into said pipe, said characterization tool is being drawn into both said membrane and said pipe, said data acquisition system including a computer and means to record the output from said means for determining said position of said characterization tool in said pipe; and
   f. a tether, said tether interconnecting said means for supporting said membrane and said characterization tool.

2. The system as set forth in claim 1, wherein said means for supporting said membrane in said housing includes a spool positioned in said housing, said tether, and said-membrane being wrapped around said spool prior to said membrane being driven into said pipe.

3. The system as set forth in claim 2, further including a motor, said motor coupled to said spool to drive said spool as said membrane is driven into said pipe and to withdraw said tether, said characterization tool and said membrane from said pipe, to control the rate at which said membrane is deployed into and retrieved from said pipe.

4. The system as set forth in claim 3, further including a membrane deployment control system, said deployment control system including means for controlling said motor and means for controlling said pressure in said housing.

5. The system as set forth in claim 4, wherein said deployment control system includes means to insure a constant deployment rate of said characterization tool.

6. The system as set forth in claim 4, further including means to detect slack, said means to detect slack being connected to said means for controlling said motor to interrupt power to said motor to prevent said membrane from continuing to unspool when said membrane is being driven into said pipe at a rate which is slower than the rate said membrane is being unspooled by said motor, and to prevent the buildup of unspooled membrane in said housing.

7. The system as set forth in claim 4, further including means for sensing the tension of said membrane and said tether during both deployment of said membrane and tether into said pipe and retrieval of said tether and membrane from said pipe, said deployment control system including means for indicating said tension in said membrane and said tether.

8. The system as set forth in claim 4, wherein said deployment control system includes a characterization tool deployment depth indicator.

9. The system as set forth in claim 8, wherein said means to determine characterization tool deployment rate includes a roller positioned in said housing to engage said membrane and an encoder coupled to said roller.

10. The system as set forth in claim 9, further including a reference position indicator, said reference position indicator located in said housing adjacent to said roller so as to be engaged by said characterization tool as said characterization tool passes over said roller, said reference position indicator being electrically connected to said deployment control system to indicate when said characterization tool enters said pipe.

11. The system as set forth in claim 4, wherein said means for pressurizing said membrane also pressurizes said housing and includes a supply of compressed fluid, said means for controlling said pressure interconnecting said supply of fluid with said housing to control the flow of fluid to said housing and, hence, the pressure in said housing.

12. The system as set forth in claim 4, wherein said computer includes means to acquire and analyze data received from said characterization tool in said pipe.

13. The system as set forth in claim 12, wherein said computer further includes data storage and means for data analysis.

14. The system as set forth in claim 3, wherein said motor is positioned in said housing.

15. The system as set forth in claim 3, further including means to detect slack, said means being electrically connected to said motor to interrupt power to said motor to prevent said membrane from continuing to unspool when said membrane is being driven into said pipe at a rate which is slower than the rate said membrane is being unspooled by said motor, to thereby prevent buildup of unspooled membrane in said housing.

16. The system as set forth in claim 15, wherein said slack detection means includes a slack indicator arm pivotally secured to said housing at one end and having a roller on the opposite end for engaging said membrane, means for biasing said roller into engagement with said membrane, and a switch connected in series with said motor and to said slack indicator arm, whereby when slack develops in said membrane, said switch is tripped open and interrupts operation of said motor.

17. The system as set forth in claim 3, further including means for monitoring the tension of said membrane and said tether during both deployment of said membrane and tether into said pipe and retrieval of said tether and membrane from said pipe.

18. The system as set forth in claim 17, wherein said tension monitoring means includes first, second and third rollers and a load cell, said first, second and third rollers positioned in said housing to engage said membrane, said first roller and said third roller exerting forces on said membrane in a first direction, said second roller exerting a force on said membrane in a second direction, substantially opposite to said first direction, said load cell being connected to said second roller to measure the force exerted on said second roller by said membrane as said membrane passes over said second roller.

19. The system as set forth in claim 18, further including means connected to said load cell and said motor, to interrupt power to said motor when said force exerted on said second roller exceeds a preset value.

20. The system as set forth in claim 1, wherein said means to determine characterization tool deployment rate includes a roller positioned in said housing to engage said membrane and an encoder coupled to said roller.

21. The system as set forth in claim 20, further including a position indicator, said position indicator located in said housing adjacent to said roller so as to be engaged by said characterization tool as said characterization tool passes over said roller, said position indicator being electrically connected to said means to determine characterization tool deployment rate.

22. The system as set forth in claim 1, wherein said housing is pressurizable and said means for pressurizing said membrane includes a fluid supply and a first valve to control the flow of said fluid to said housing and, hence, the pressure in said housing and said membrane.

23. The system as set forth in claim 22, further including a first pressure relief valve connected to said housing, said first pressure relief valve being set for a predetermined first relief pressure.

24. The system as set forth in claim 23, further including a second pressure relief valve connected to said housing, said second pressure relief valve being set for a predetermined second relief pressure, said second relief pressure being higher than said first pressure relief, said first pressure relief valve being connected to said housing by a second valve whereby when said second valve is closed, the pressure in said housing can be increased.

25. The system as set forth in claim 24 further including means for reducing said pressure in said housing to a third pressure, said pressure reducing means including a third pressure relief valve set for a third predetermined pressure, said third pressure being less than said first pressure, said third pressure relief valve being connected to said housing by a third valve, whereby when said third valve is open said pressure in said housing is reduced to said third pressure through said third pressure relief valve.

26. The system as set forth in claim 25, wherein said fluid supply is a compressed gas.

27. The system as set forth in claim 1, wherein said membrane includes a scintillation material sensitive to alpha and/or beta radiation.

28. The system as set forth in claim 27, wherein said characterization tool is a photodetector.

29. The system as set forth in claim 27, wherein said material is selected from the group including zinc sulfide, diphearyl, anthracene, CdS(Ag), $CaWO_4$, and NaITh.

30. The system according to claim 1, further including an extension device, said extension device having a first portion, a canister attachment end at one end of said first portion, and a pipe attachment end at an other end of said first portion, and a second portion, said second portion having an access end.

31. The system according to claim 30, further including a tether swipe.

32. The system according to claim 31, wherein, said tether swipe includes a first member mounted to said second portion, a swipe support portion, and at least one smear, said first member attached to said swipe support portion, said smear attached to said swipe support portion.

33. The system according to claim 32, wherein said smear is placed on one end of said swipe support portion, and further including a second smear attached to said swipe support portion on an opposite end.

34. The system according to claim 30, further including a first cam lever couple securely attached to said canister attachment end, a second cam lever couple securely attachable to said pipe attachment end, and a pressure-tight cam lever attachable to said access end.

35. The system as set forth in claim 1, wherein said characterization tool includes a sensor.

36. The system as set forth in claim 35, wherein said characterization tool also includes a source of stimulation.

37. The system as set forth in claim 1, wherein said characterization tool is a video camera and a source of illumination.

38. The system as set forth in claim 1, wherein said characterization tool is an ultrasonic non-destructive evaluation device.

39. The system as set forth in claim 1, wherein said characterization tool is a device adapted to detect radioactive material.

40. The system as set forth in claim 1, wherein said characterization tool includes a laser.

41. The system as set forth in claim 1, wherein said characterization tool is a radiation induced x-ray fluorescence device.

42. The system as set forth in claim 1, wherein said characterization tool includes a UV fluorescence detector.

43. A method of transporting a characterization tool in a pipe, said method comprising:
   a. providing an elongated, inflatable impermeable membrane having first and second ends and a characterization tool secured to one of said ends;
   b. driving said membrane into said pipe with fluid pressure, said fluid pressure inflating and inverting said membrane as said membrane is driven into said pipe;
   c. towing said characterization tool inside of said pipe and inside of said membrane;
   d. controlling the rate of deployment of said characterization tool into said pipe; and
   e. determining the position of said characterization tool in said pipe.

44. The method as set forth in claim 43, further including the step of detecting slack in said membrane as said membrane is being driven into said pipe.

45. The method as set forth in claim 43, further including the step of monitoring tension in said membrane and stopping deployment of said membrane when said tension reaches a predetermined level.

46. The method as set forth in claim 43, further including controlling the pressure in said membrane.

47. The method as set forth in claim 46, further including the steps of:
   a. providing a first pressure sufficient to .drive said membrane into said pipe;
   b. reducing said first pressure in said membrane to a second pressure sufficient to maintain said membrane in contact with the inner surfaces of said pipe;
   c. withdrawing said membrane while maintaining said second pressure to reinvert said membrane.

48. The method as set forth in claim 47, further including the step of increasing said first pressure to a third pressure to drive the leading end of said membrane past an obstruction in said pipe.

49. A system for transporting a characterization tool in a pipe, said system comprising:
   a. an elongated, inflatable impermeable membrane said membrane having first and second ends;
   b. a housing, said housing including,
      i. means for supporting said membrane in said housing; and
      ii. means for coupling said housing to said pipe;
   c. means for attaching said first end to said housing;
   d. means for pressurizing said membrane, to inflate, invert and drive said membrane into said pipe;
   e. means for characterizing at least interior portions of said pipe, said means for characterizing including a characterization tool, and means to determine characterization tool deployment rate into and position in said pipe, said characterization tool secured to said second end of said membrane whereby, as said membrane is being inflated and driven into said pipe, said characterization tool is being drawn into both said membrane and said pipe; and
   f. a tether, said tether interconnecting said means for supporting said membrane and said characterization tool.

* * * * *